May 6, 1930.  A. Y. DODGE  1,757,074
BRAKE OPERATING SHAFT AND ITS MOUNTING
Filed Oct. 16, 1926
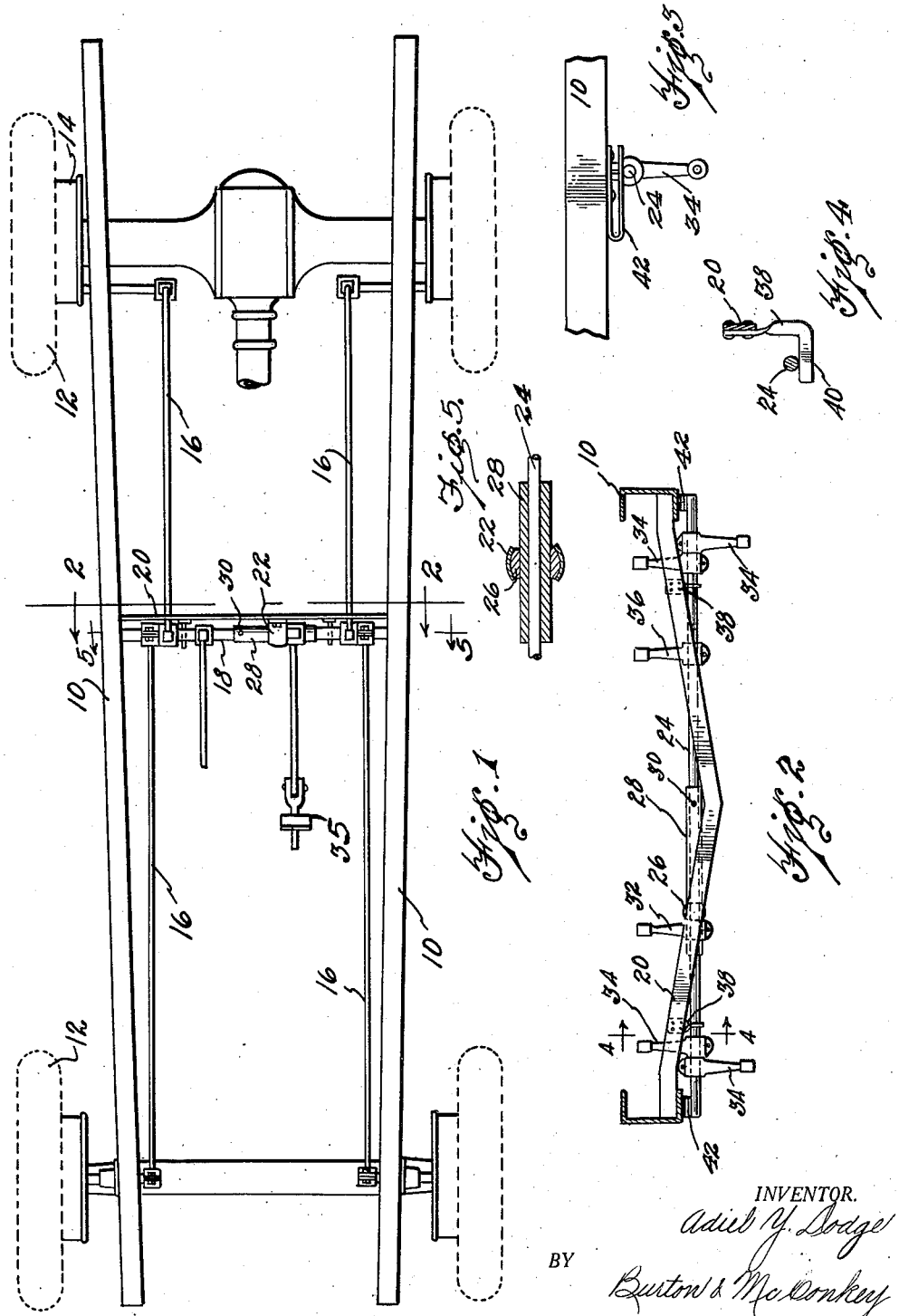
INVENTOR.
Adiel Y. Dodge
BY
Burton & McConkey
ATTORNEYS Patented May 6, 1930

1,757,074

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE-OPERATING SHAFT AND ITS MOUNTING

Application filed October 16, 1926. Serial No. 141,949.

My invention relates to improvements in road vehicle brakes and particularly to an improved mounting for a brake operating shaft as employed on a vehicle of this type.

The object is to provide an operating shaft having connections leading to the brakes of the several wheels of the vehicle, which shaft is so supported as to be self aligning and adapted to accommodate itself with the utmost facility to temporary distortions of the frame of the vehicle during road travel and so mounted as to be easily actuated at all times and under varying conditions of travel. The shaft is so constructed that not only does it accommodate itself readily to the road travel of the vehicle but the torque applied thereto from the operating pedal or lever is equalized in its transmission to the brakes applied to the wheels, notwithstanding the character of the road over which the vehicle is traveling.

In the drawing:

Fig. 1 is a plan of a conventional road vehicle chassis provided with my invention.

Fig. 2 is a sectional view taken on line 2—2 of Fig. 1.

Fig. 3 is an end elevation of the structure shown in Fig. 2.

Fig. 4 is a sectional view taken on line 4—4 of Fig. 2.

Fig. 5 is a sectional view taken on line 5—5 of Fig. 1.

I have shown a vehicle chassis having channel side frames 10 and supported by front and rear wheels 12, which wheels are here shown as having brakes 14. Brake operating connections 16 lead from the brake structures to a rotatably supported shaft indicated in assembly as 18 and illustrated as embodying my improvement.

A cross frame member 20 intervenes the side frame members 10 at a point intermediate the supporting wheels. This cross frame member is bent downwardly as illustrated in Fig. 2. It is provided with a bracket 22 which has a part that embraces a ball portion upon the shaft 18 and serves as a self aligning supporting bearing for such shaft. A sleeve 28 is mounted upon the shaft proper 24. This sleeve is pinned to the shaft substantially midway between the ends of the shaft to equalize the application of torque thereto. The ball is mounted upon the sleeve. The operating arm 32 is mounted upon the sleeve adjacent the ball support 26 and a pedal structure and connection 35 is coupled with such arm to actuate the shaft. There is fixed upon the shaft the required number of arms 34, which have connections leading to the brakes associated with the vehicle wheels and at 36 I have shown an arm which may be coupled with a hand lever to serve as a second means for actuating the shaft.

It will be seen that the shaft is so supported that its ends are spaced below the side frame members 10. Brackets 38 depend below the cross frame member 20 and are provided with portions 40 which extend underneath the shaft 24 and serve as stops to limit the downward vertical swing of the ends of the shaft.

A spring 42 is provided at each end of the shaft. This spring exerts a pressure upon each end of the shaft to hold it toward the stop 40 of the bracket 38. In Fig. 3 of the drawing I have shown this spring as being a flat spring bent upon itself and having one leaf frictionally engaging the upper surface of the shaft 24 so that such shaft may move relatively to the spring but is always held under tension thereby.

The springs 42 exert a pressure upon the free ends of the shaft which tend to hold the shaft in alignment as it is supported by the self aligning bearing 26 but the ends of the shaft have a permitted movement rearwardly and forwardly as well as a slight vertical movement.

The connections which lead from the rotatably supported shaft to the brakes of the several wheels serve to actuate such brakes and the operating connection with the shaft is arranged substantially intermediate the ends of the shaft so as to equalize the torque applied thereto and the sleeve which surrounds the shaft and with which the connection is directly made is supported not only for rotation, to accomplish the rotation of the shaft but is supported as above set forth for rockable movement of a substantially universal character within limits, to accommodate for temporary distortions of the frame of the car as it travels over the road.

What I claim is:

1. In a motor vehicle, a chassis having side frame members and supported by front and rear wheels provided with brakes, a brake operating shaft extending transversely of the chassis and supported at a point intermediate the side frame members by a self aligning bearing which permits universal movement of the ends of the shaft, rigid stops limiting the movement of the ends of the shaft within a determined range and means yieldingly engaging each end of the shaft to hold the shaft in alignment.

2. In a motor vehicle, a chassis having side frame members and supported by front and rear wheels provided with brakes, a brake operating shaft extending transversely of the chassis and supported at a point intermediate the side frame members by a self aligning bearing which permits universal movement of the ends of the shaft, rigid stops limiting the movement of the ends of the shaft within a determined range and means yieldingly, frictionally engaging each end of the shaft to hold the shaft in alignment while permitting relative movement thereof.

3. In a road vehicle having supporting wheels provided with brakes and spaced side frame members, a brake operating shaft extending transversely thereof and rotatably supported upon a rockable bearing and means yieldingly, frictionally engaging each end of the shaft to hold the shaft in alignment while permitting limited rockable movement thereof.

4. In a road vehicle having supporting wheels provided with brakes and spaced side frame members, a brake operating shaft extending transversely thereof and rotatably supported upon a rockable bearing, and means yieldingly, frictionally engaging each end of the shaft to limit its rockable movement upon said bearing and rigid stops to definitely limit the movement of each end of the shaft.

5. In a road vehicle having supporting wheels provided with brakes and spaced side frame members, a brake operating shaft extending transversely thereof and rotatably supported upon a rockable bearing, and means carried by each side frame member yieldingly, frictionally engaging the adjacent end of the shaft to limit its rockable movement.

6. In a road vehicle having supporting wheels provided with brakes and spaced side frame members, a brake operating shaft extending transversely thereof and rotatably supported upon a rockable bearing, and means intervening each side frame member and the adjacent end of the shaft, exerting a yielding pressure on such end of the shaft to hold the shaft in alignment.

7. In a road vehicle having supporting wheels provided with brakes and spaced side frame members, a brake operating shaft extending transversely thereof and rotatably supported upon a rockable bearing, and spring means depending below each side frame member, frictionally yieldingly engaging the adjacent end of the shaft to hold the shaft in alignment.

8. In a road vehicle having supporting wheels provided with brakes and spaced side frame members, a brake operating shaft extending transversely thereof and rotatably supported upon a rockable bearing, spring means depending below each side frame member, frictionally, yieldingly engaging the adjacent end of the shaft to hold the shaft in alignment and rigid abutments limiting the constrained travel of each end of the shaft.

9. In a road vehicle having front and rear supporting wheels, each provided with a brake, and side frame members braced by a cross frame section, a brake operating shaft supported by a self aligning bearing carried by said cross frame section, said shaft provided with operating connections leading to the brakes of the several wheels, said brake operating shaft so mounted as to have each end portion freely disposed underneath a side frame member of the vehicle and held downwardly relative to said side frame member by an expansible spring.

10. A road vehicle having front and rear wheels provided with brakes and having side frame members provided at a point intermediate the front and rear wheels with a cross frame section, a brake operating shaft rockably supported at a point intermediate its ends by said cross frame section, an expansible spring mounted upon each side frame member, frictionally, yieldingly engaging the adjacent end of said brake operating shaft to limit the movement of such end of the shaft.

11. In a road vehicle having supporting wheels and side frame members connected by a cross frame member, a brake operating shaft rockably supported upon said cross frame member, a pair of stops carried by said cross frame member to limit the movement of the ends of said shaft, a pair of springs, one carried by each side frame member to restrain the movement of each end of the shaft while permitting such movement within determined limits both with and relative to said spring member.

12. In a road vehicle having front and rear supporting wheels and side frame members connected by a downwardly bent cross frame section, a brake operating shaft rockably supported upon a bearing carried by said cross frame section at a point below the side frame members and having its ends disposed below the side frame members an expansion spring intervening the ends of the shaft and the side frame members to restrain the movement of the ends of the shaft.

13. A road vehicle having front and rear wheels, chassis side frame members connected by a cross section bent downwardly intermediate the said side frame members, a brake operating shaft, a sleeve upon the shaft for a portion of its length and secured thereto at a point substantially midway the ends thereof, a bracket carried by said cross section, said shaft rockably supported by said bracket below the level of the side frame members of the chassis and having its ends extending underneath and spaced below said side frame members and a leak spring carried by each side frame member of the chassis, frictionally engaging the ends of the shaft to exert a downward pressure thereon.

14. A road vehicle having front and rear wheels, chassis side frame members connected by a cross section bent downwardly intermediate the said side frame members, a brake operating shaft, a sleeve upon the shaft for a portion of its length and secured thereto at a point substantially midway the ends thereof, a bracket carried by said cross section, said shaft rockably supported by said bracket below the level of the side frame members of the chassis and having its ends extending underneath and spaced below said side frame members, spring means engaging each end of the shaft to limit its rockable movement and rigid stops adapted to definitely limit the swing of each end of the shaft.

15. Brake operating mechanism for a vehicle having wheels provided with brakes including an operating shaft connected with the brakes, said shaft being rotatably supported intermediate its ends upon a bearing adapted to also permit limited universal rockable movement of the shaft.

16. Brake operating mechanism for a vehicle having a frame provided with wheels equipped with brakes, comprising a brake operating shaft extending transversely of the vehicle beneath the frame, connections between the shaft and the brakes, a part surrounding the shaft and supporting the same and coupled therewith to apply rotatable torque thereto substantially intermediate the ends of the shaft, said part being rotatably and rockably supported, and an operating member connected with the part to rotate the shaft.

In testimony whereof, I, ADIEL Y. DODGE, sign this specification.

ADIEL Y. DODGE.